United States Patent
Ito et al.

(10) Patent No.: US 10,569,722 B2
(45) Date of Patent: Feb. 25, 2020

(54) WIRE HARNESS

(71) Applicant: Yazaki Corporation, Tokyo (JP)

(72) Inventors: Ken Ito, Shizuoka (JP); Naoto Ishikawa, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 16/229,688

(22) Filed: Dec. 21, 2018

(65) Prior Publication Data

US 2019/0111866 A1    Apr. 18, 2019

Related U.S. Application Data

(63) Continuation of application No. PCT/JP2017/020570, filed on Jun. 2, 2017.

(30) Foreign Application Priority Data

Jun. 29, 2016   (JP) ................................ 2016-128711

(51) Int. Cl.
| | | |
|---|---|---|
| *B60R 16/02* | (2006.01) | |
| *B60R 16/08* | (2006.01) | |
| *H01B 7/00* | (2006.01) | |
| *H01B 7/42* | (2006.01) | |

(52) U.S. Cl.
CPC ......... *B60R 16/0207* (2013.01); *B60R 16/02* (2013.01); *B60R 16/08* (2013.01); *H01B 7/00* (2013.01); *H01B 7/0045* (2013.01); *H01B 7/421* (2013.01)

(58) Field of Classification Search
None
See application file for complete search history.

(56) References Cited

U.S. PATENT DOCUMENTS

| | | | | |
|---|---|---|---|---|
| 4,827,242 A | * | 5/1989 | Blankenship | .......... G01N 17/02 204/404 |
| 5,267,338 A | * | 11/1993 | Bullock | ................. G02B 6/447 385/100 |
| 5,739,470 A | * | 4/1998 | Takeda | ................. H02G 3/0487 174/101 |
| 5,866,843 A | * | 2/1999 | Ikeda | .................. B60R 16/0215 174/36 |

(Continued)

FOREIGN PATENT DOCUMENTS

| | | |
|---|---|---|
| JP | 58-143753 U | 9/1983 |
| JP | 62-032283 U | 2/1987 |

(Continued)

OTHER PUBLICATIONS

International Search Report for PCT/JP2017/020570 dated Jul. 18, 2017 [PCT/ISA/210].

(Continued)

*Primary Examiner* — Timothy J Thompson
*Assistant Examiner* — Muhammed Azam
(74) *Attorney, Agent, or Firm* — Sughrue Mion, PLLC

(57) ABSTRACT

A wire harness includes a conductive first wiring material, wired to a vehicle, and a second wiring material wired to the vehicle in a state where at least a part of the second wiring material is bundled with the first wiring material. The second wiring material has a flow passage formed therein through which a liquid can flow.

12 Claims, 4 Drawing Sheets

(56) References Cited

U.S. PATENT DOCUMENTS

| | | | | |
|---|---|---|---|---|
| 6,229,091 B1* | 5/2001 | Ogawa | B60R 16/0215 | 174/72 A |
| 6,659,423 B1* | 12/2003 | Dauvergne | B60H 1/00514 | 165/43 |
| 6,861,589 B2* | 3/2005 | Katsumata | H02G 3/0487 | 174/68.3 |
| 7,344,156 B2* | 3/2008 | Suzuki | B60R 16/0215 | 174/69 |
| 9,485,892 B2* | 11/2016 | Nakata | H01B 7/08 | |
| 9,490,613 B2* | 11/2016 | Kato | H02G 1/00 | |
| 2001/0002623 A1* | 6/2001 | Tsunoda | B60R 16/0207 | 174/72 A |
| 2002/0148632 A1* | 10/2002 | Kasuya | B21F 23/005 | 174/72 A |
| 2002/0170729 A1* | 11/2002 | Murakami | B60R 16/0215 | 174/386 |
| 2003/0056744 A1* | 3/2003 | Katayama | F01L 1/022 | 123/90.17 |
| 2003/0070830 A1* | 4/2003 | Kondo | B60R 16/0207 | 174/68.1 |
| 2003/0194187 A1* | 10/2003 | Simmons | B60R 16/0215 | 385/53 |
| 2004/0252429 A1* | 12/2004 | Virgin | B60R 16/02 | 361/62 |
| 2005/0161267 A1* | 7/2005 | Elson | B60K 15/063 | 180/65.1 |
| 2006/0075848 A1* | 4/2006 | Suzuki | B60R 16/0207 | 74/606 R |
| 2006/0219424 A1* | 10/2006 | Hamazu | H02G 3/0666 | 174/72 A |
| 2007/0039751 A1* | 2/2007 | Fuller | B60R 16/0222 | 174/72 A |
| 2007/0107962 A1* | 5/2007 | Steinberg | H05K 7/20927 | 180/68.2 |
| 2007/0146973 A1* | 6/2007 | Leiber | B60R 16/0207 | 361/641 |
| 2010/0089515 A1* | 4/2010 | Malloy | H01B 3/50 | 156/56 |
| 2011/0045697 A1* | 2/2011 | Sawamura | B60R 16/0207 | 439/587 |
| 2012/0082807 A1* | 4/2012 | Malloy | F01N 13/148 | 428/34.1 |
| 2013/0196104 A1* | 8/2013 | Matsumoto | C08L 79/08 | 428/36.92 |
| 2013/0341108 A1* | 12/2013 | Mensah | F04B 17/00 | 180/65.31 |
| 2014/0377623 A1* | 12/2014 | Pyzza | H01G 11/10 | 429/120 |
| 2015/0060109 A1* | 3/2015 | Matsuda | B60R 16/0207 | 174/163 R |
| 2016/0141070 A1* | 5/2016 | Heipel | H01B 7/04 | 174/72 A |
| 2016/0208670 A1* | 7/2016 | Dylhoff | F01N 11/002 | |
| 2017/0001492 A1* | 1/2017 | Ito | H01L 23/373 | |
| 2017/0146761 A1* | 5/2017 | Ernst | G02B 6/4436 | |
| 2017/0221601 A1* | 8/2017 | Tanigawa | B60R 16/0215 | |
| 2017/0345527 A1* | 11/2017 | Royston | H01B 7/295 | |
| 2017/0360288 A1* | 12/2017 | Kirn | A61J 15/0026 | |
| 2018/0345971 A1* | 12/2018 | Birnschein | B60L 58/10 | |
| 2019/0111866 A1* | 4/2019 | Ito | B60R 16/0207 | |
| 2019/0112966 A1* | 4/2019 | Schoeneman | F01P 7/16 | |
| 2019/0148036 A1* | 5/2019 | Royston | H01B 7/295 | |

FOREIGN PATENT DOCUMENTS

| | | |
|---|---|---|
| JP | 05-055039 U | 7/1993 |
| JP | 09-254721 A | 9/1997 |
| JP | 2013-239419 A | 11/2013 |
| JP | 5825196 B2 | 12/2015 |

OTHER PUBLICATIONS

Notification of Reasons for Refusal for JP 2016-128711 dated Jun. 26, 2018.

* cited by examiner

WIRE HARNESS

CROSS-REFERENCE TO RELATED APPLICATION

This application is a continuation application of International Application No. PCT/JP2017/020570 filed on Jun. 2, 2017 which claims the benefit of priority from Japanese Patent Application No. 2016-128711 filed on Jun. 29, 2016 and designating the U.S., the entire contents of which are incorporated herein by reference.

BACKGROUND OF THE INVENTION

1. Field of the Invention

The present invention relates to a wire harness.

2. Description of the Related Art

As a conventional wire harness applied to a vehicle, for example, Japanese Patent Application Laid-open No. 09-254721 discloses a wire harness for automobiles that is commonly used for four types of vehicles: a right-hand drive vehicle, a left-hand drive vehicle, a sedan type vehicle, and a van type vehicle.

Incidentally, the wire harness for automobiles described in the above-mentioned Japanese Patent Application Laid-open No. 09-254721 has room for further improvement from a viewpoint of enhancing assemblability in consideration of various devices using a fluid such as a liquid in a vehicle, for example.

SUMMARY OF THE INVENTION

The present invention has been made in view of the above circumstances, and an object thereof is to provide a wire harness capable of enhancing assemblability to a vehicle.

In order to achieve the above mentioned object, a wire harness according to one aspect of the present invention includes a conductive first wiring material wired to a vehicle; and a second wiring material wired to the vehicle in a state where at least a part of the second wiring material is bundled with the first wiring material, and having a flow passage formed therein through which a liquid can flow.

According to another aspect of the present invention, in the wire harness, it is possible to further include a sheath material that bundles the first wiring material and the second wiring material.

According to still another aspect of the present invention, in the wire harness, it is possible to configure that the sheath material includes a first accommodation space into which the first wiring material is inserted, and a second accommodation space which is partitioned from the first accommodation space and into which the second wiring material is inserted.

According to still another aspect of the present invention, in the wire harness, it is possible to configure that the second wiring material and the sheath material are integrally formed.

According to still another aspect of the present invention, in the wire harness, it is possible to configure that the second wiring material constitutes a circulation path that connects a heat source unit that generates heat and a heat consumption unit that consumes heat, and the liquid is a heat exchange medium that circulates through the circulation path constituted by the second wiring material and exchanges heat in the heat source unit and the heat consumption unit.

According to still another aspect of the present invention, in the wire harness, it is possible to configure that the second wiring material further constitutes the circulation path connected to the heat accumulation unit that accumulates heat.

According to still another aspect of the present invention, in the wire harness, it is possible to configure that the second wiring material constitutes a supply path that connects a storage unit that stores the liquid and a injecting unit that injects the liquid to a cleaning target portion, and the liquid is a cleaning liquid supplied from the storage unit to the injecting unit via the supply path constituted by the second wiring material.

According to still another aspect of the present invention, in the wire harness, it is possible to further include an external connection part capable of connecting the second wiring material and an external device for the vehicle.

According to still another aspect of the present invention, in the wire harness, it is possible to configure that the first wiring material includes a power supply line for power supply and a communication line for signal communication.

In order to achieve the above mentioned object, a wire harness according to still another aspect of the present invention includes a conductive first wiring material wired to a vehicle; and a second wiring material wired to the vehicle in a state where at least a part of the second wiring material is bundled with the first wiring material, and having a flow passage formed therein through which a heat exchange medium can flow.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments according to the present invention will be described in detail with reference to the drawings. Note that the present invention is not limited by the embodiments. In addition, components in the following embodiments include those that can be easily replaced by those skilled in the art, or those that are substantially the same.

First Embodiment

Figure 1:
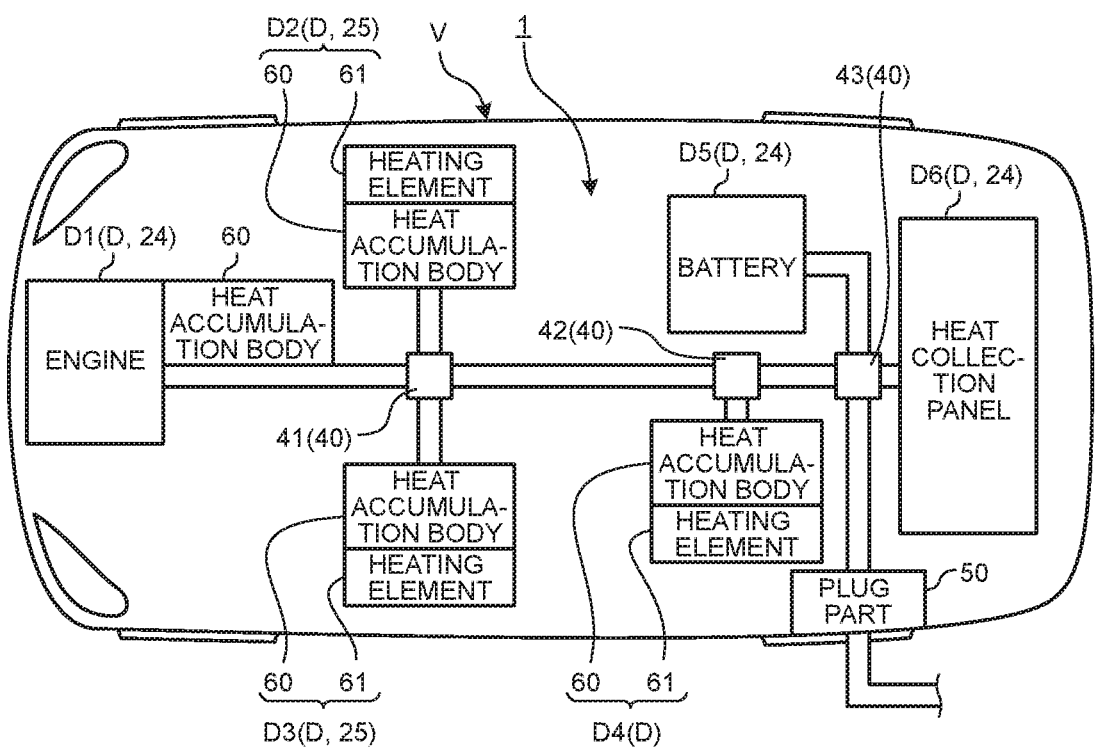
FIG. 1 is a schematic block diagram representing a schematic configuration of a vehicle to which a wire harness according to a first embodiment is applied.
Figure 1:
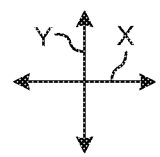
Figure 2:
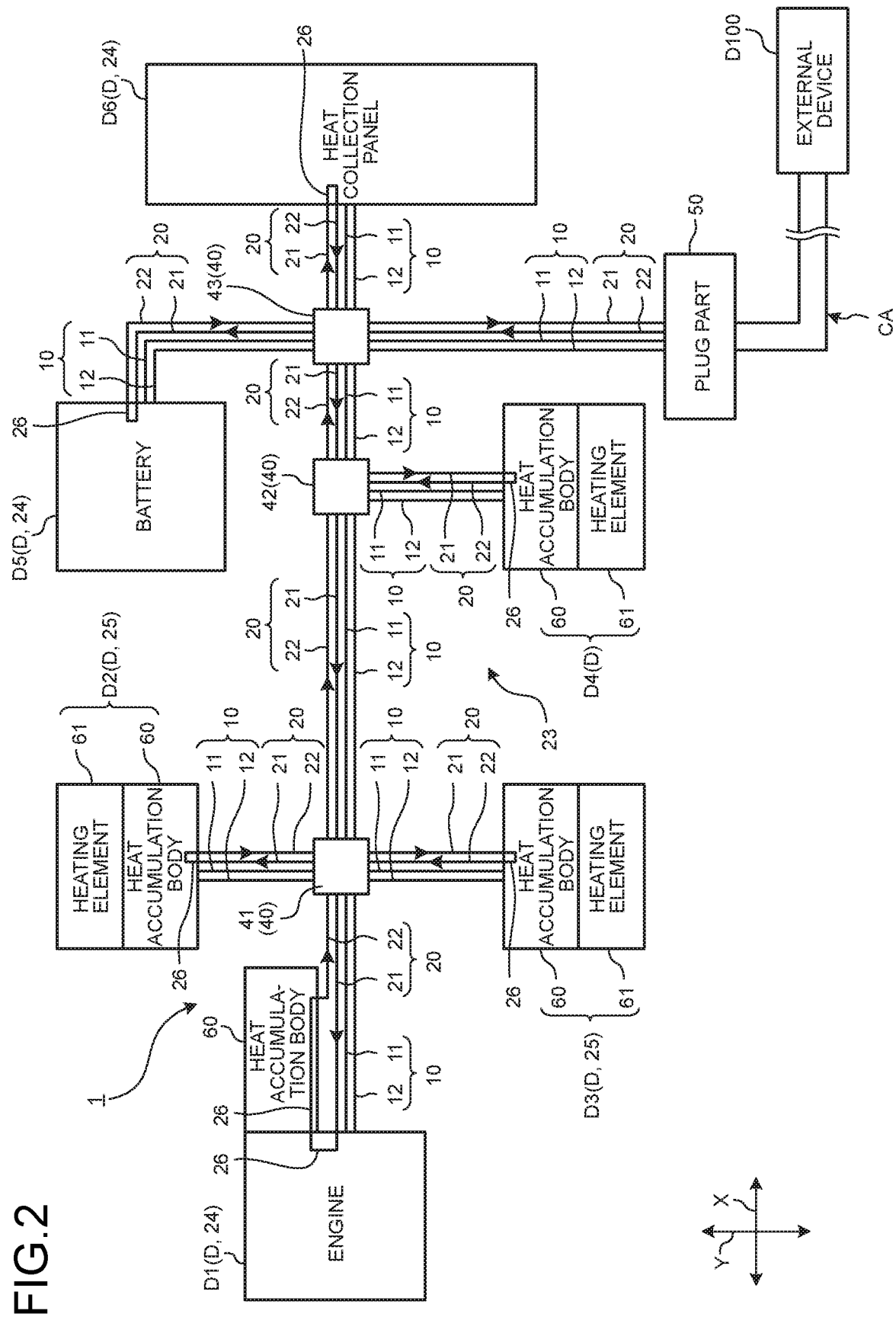
FIG. 2 is a schematic block diagram representing a schematic configuration of the wire harness according to the first embodiment.
Figure 3:
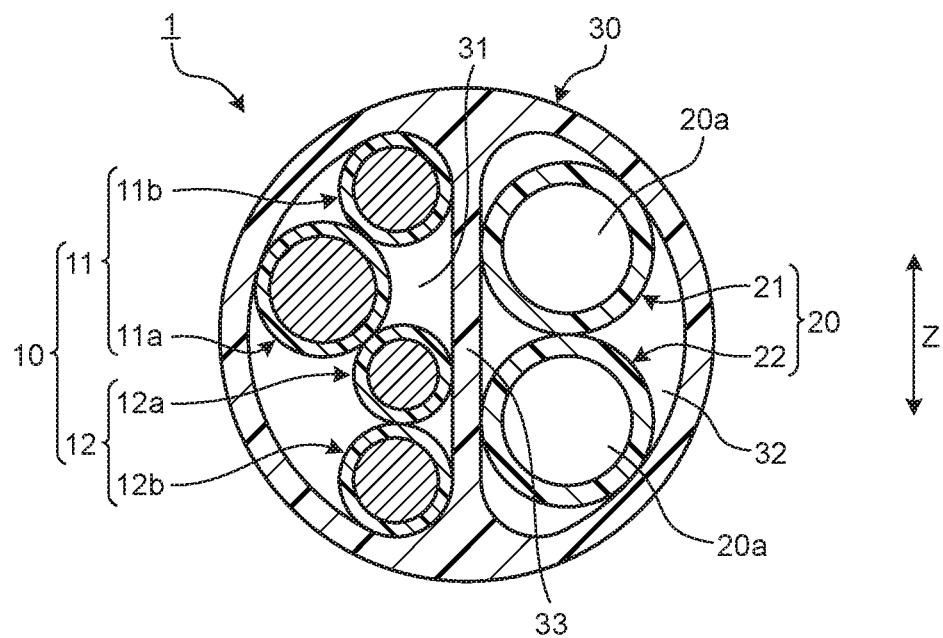
FIG. 3 is a schematic cross-sectional view representing the schematic configuration of the wire harness according to the first embodiment.

A wire harness 1 of the present embodiment illustrated in FIGS. 1, 2, and 3 is a wire harness module which is applied to a vehicle V, and used for power supply and signal communication by connecting each device D mounted on the vehicle V. Further, the wire harness 1 of the present embodiment is a structural electric module configured to electrically connect various devices D mounted on the vehicle V by a first wiring material 10 to supply electric power to the various devices D via the first wiring material 10, and further to connect the various devices D by a second wiring material 20 wired to the vehicle V in a state where at least a part of the second wiring material 20 is bundled with the first wiring material 10 such that a fluid such as a liquid can flow through the various devices D via the second wiring material 20. Hereinafter, a configuration of the wire harness 1 will be described in detail with reference to each of the drawings.

Note that here, in the vehicle V to which the wire harness 1 is applied, a "vehicle longitudinal direction X" typically corresponds to an entire length direction of the vehicle V, and more concretely, corresponds to a direction along a straight advancing direction of the vehicle V. A "vehicle width direction Y" typically corresponds to an entire width direction of the vehicle V, and corresponds to a vehicle lateral direction of the vehicle V. A "vehicle height direction Z" typically corresponds to a vehicle height direction of the vehicle V. The vehicle longitudinal direction X as a first direction, the vehicle width direction Y as a second direction, and the vehicle height direction Z as a third direction are orthogonal to one another, and in a state where the vehicle V is positioned on a horizontal plane, the vehicle longitudinal direction X and the vehicle width direction Y are along a horizontal direction, and the vehicle height direction Z is along a vertical direction. In addition, in the following description, in the vehicle longitudinal direction X, a side toward which the vehicle V advances may be referred to as "front", and a side toward which the vehicle V moves back may be referred to as "back". In the vehicle width direction Y, a left side toward the front in the vehicle longitudinal direction X may be referred to as "left", and a right side toward the front in the vehicle longitudinal direction X may be referred to as "right". In the vehicle height direction Z, an upper side in the vertical direction may be referred to as "upper", and a lower side in the vertical direction may be referred to as "lower". Each direction used in the following description represents a direction in a state where parts are assembled to one another, unless otherwise specified.

Specifically, as illustrated in FIGS. 1, 2, and 3, the wire harness 1 includes the first wiring material 10 wired to the vehicle V, the second wiring material 20 wired to the vehicle V in a state where at least a part of the second wiring material 20 is bundled with the first wiring material 10, a sheath material 30, a branch part 40, and a plug part 50 as an external connection part. The first wiring material 10 and the second wiring material 20 connect the various devices D mounted on the vehicle V to one another. In addition, as an example, the branch part 40 of the present embodiment is illustrated as including three parts in total: a first branch part 41, a second branch part 42, and a third branch part 43. Note that, in the following description, the first branch part 41, the second branch part 42, and the third branch part 43 are simply referred to as the branch part 40 in a case where it is not particularly necessary to distinguish them from one another.

Here, in the examples of FIGS. 1 and 2, examples of the various devices D mounted on the vehicle V include an engine D1, heating devices D2 and D3, a heat accumulation device D4, a battery D5, and a heat collection panel D6. The engine D1 is a travel power source that generates traveling power of the vehicle V, and is a heat engine that generates the power by burning a fuel. The heating devices D2 and D3 are provided in a seat, a floor, a steering, or the like of the vehicle V to heat them by thermal energy, and various types of the heating devices can be used. The heating devices D2 and D3 may be provided in an instrument panel of the vehicle V to heat an air in the vehicle V by thermal energy. The heat accumulation device D4 is an apparatus capable of accumulating thermal energy, and various types of the heat accumulation devices that can accumulate heat, and can dissipate heat as necessary can be used. The battery D5 is a power accumulation device capable of accumulating electric energy, and various types of secondary batteries that can accumulate electric power and discharge the power as necessary can be used. The power accumulation device is not limited to the battery D5, but may be a condenser, a capacitor, or the like. The heat collection panel D6 is provided on an outer surface of the vehicle V for collecting solar heat (thermal energy) or converting sunlight (light energy) into thermal energy to collect the thermal energy, and various types of the heat collection panel can be used. For example, the wire harness 1 may be modularized including these various devices D (the engine D1, the heating devices D2 and D3, the heat accumulation device D4, the battery D5, and the heat collection panel D6), or modularized without including these various devices D.

The first wiring material 10 is a conductive wiring material. The first wiring material 10 electrically connects the various devices D mounted on the vehicle V, here, the engine D1, the heating devices D2 and D3, the heat accumulation device D4, the battery D5, and the heat collection panel D6 to one another. The first wiring material 10 includes, for example, an electric wire formed by applying insulation coating to a core wire formed by bundling or twisting a plurality of conductive metal strands, a metal rod formed by applying insulation coating to a conductive rod member, a bus bar, and a planar circuit body (for example, flexible printed circuits (FPC), flexible flat cable (FFC), and the like).

The first wiring material 10 of the present embodiment includes a power supply line 11 for power supply and a communication line 12 for signal communication, and is typically formed by bundling these lines. The power supply line 11 and the communication line 12 are linear wiring bodies wired to the vehicle V, and constitute a part of a plurality of circuits in the wire harness 1. The power supply line 11 is a linear conductor used for power supply, and is configured to supply electric power for driving each device D. As an example, the power supply line 11 of the present embodiment includes two lines in total: a power line 11a for power supply and a ground wire 11b for grounding (see particularly FIG. 3). The power line 11a is, for example, a wiring body that supplies electric power of a predetermined voltage (for example, 12 V or 48 V). The ground wire 11b is a wiring body for so-called grounding (ground). Each power supply line 11 may be for direct current or for alternating current depending on required specifications and the like. The communication line 12 is a linear conductor used for signal communication, and is configured to supply various signals to each device D. As an example, a plurality of communication lines 12 of the present embodiment includes two communication lines 12a and 12b for communication in total (see particularly FIG. 3). Each of the communication lines 12a and 12b is, for example, a wiring body (for example, for SIG+ or SIG−) for achieving communication by various methods. That is, the first wiring material 10 of the present embodiment is formed by bundling four lines in total: the power line 11a for power supply, the ground wire 11b for grounding, and the communication lines 12a and 12b for communication, and is wired to the vehicle V. The first wiring material 10 (the power line 11a, the ground wire 11b, and the communication lines 12a and 12b) branches at the branch part 40 and is electrically connected to each device D, the plug part 50, and the like. In the examples of FIGS. 1 and 2, the first wiring material 10 includes one that connects the first branch part 41 of the branch part 40 and the engine D1, one that connects the first branch part 41 and the heating device D2, one that connects the first branch part 41 and the heating device D3, one that connects the first branch part 41 and the second branch part 42 of the branch part 40, one that connects the second branch part 42 and the heat accumulation device D4, one that connects the second branch part 42 and the third branch part 43 of the branch part 40, one that connects the third branch part 43 and the battery D5, one that connects the third branch part 43 and the heat collection panel D6, and one that connects the third branch part 43 and the plug part 50. Each end portion of each first wiring material 10 is electrically connected to various devices D, the branch part 40, the plug part 50, and the like via a circuit connection part such as a connector. Note that, in the following description, the power supply line 11 and the communication line 12 are simply referred to as the first wiring material 10 when it is not particularly necessary to distinguish them from each other. Similarly, the power line 11a and the ground wire 11b are simply referred to as the power supply line 11 when it is not particularly necessary to distinguish them from each other. The communication lines 12a and 12b are simply referred to as the communication line 12 when it is not particularly necessary to distinguish them from each other.

The second wiring material 20 is a hollow wiring material wired to the vehicle V in a state where at least a part of the second wiring material 20 is bundled with the first wiring material 10, and having a flow passage 20a formed therein through which a fluid such as a liquid can flow (see particularly FIG. 3). The second wiring material 20 of the present embodiment is wired extending entirely along the first wiring material 10, and bundled with the first wiring material 10. The second wiring material 20 connects the various devices D mounted on the vehicle V, here, the engine D1, the heating devices D2 and D3, the heat accumulation device D4, the battery D5, and the heat collection panel D6 to one another, such that a fluid such as a liquid can flow therethrough. The second wiring material 20 is, for example, a tubular member formed into a cylindrical shape such as a cylinder, and a space on a cylindrical inner circumference side constitutes the flow passage 20a. The flow passage 20a is the space through which a fluid such as a liquid can flow. The second wiring material 20 is formed of a resin material and the like having relatively high flexibility so as to facilitate bending.

The second wiring material 20 of the present embodiment includes a first pipe 21 and a second pipe 22, and is typically formed by bundling these pipes. That is, the second wiring material 20 of the present embodiment is formed by bundling two pipes in total: the first pipe 21 and the second pipe 22, and is wired to the vehicle V. The first pipe 21 and the second pipe 22 are typically configured such that a fluid such as a liquid flows in each flow passage 20a mutually in a reverse direction. The second wiring material 20 of the present embodiment constitutes a circulation path 23 by the first pipe 21 and the second pipe 22. The circulation path 23 connects the various devices D and the plug part 50 mounted on the vehicle V to one another and circulates a fluid such as a liquid flowing through the flow passage 20a. Each second wiring material 20 (the first pipe 21 and the second pipe 22) branches at the branch part 40, is connected to each device D, the plug part 50, and the like, and constitutes the circulation path 23. In the examples of FIGS. 1 and 2, the second wiring material 20 includes one that connects the first branch part 41 of the branch part 40 and the engine D1, one that connects the first branch part 41 and the heating device D2, one that connects the first branch part 41 and the heating device D3, one that connects the first branch part 41 and the second branch part 42 of the branch part 40, one that connects the second branch part 42 and the heat accumulation device D4, one that connects the second branch part 42 and the third branch part 43 of the branch part 40, one that connects the third branch part 43 and the battery D5, one that connects the third branch part 43 and the heat collection panel D6, and one that connects the third branch part 43 and the plug part 50, and constitutes the circulation path 23. Each end portion of each second wiring material 20 is electrically connected to the various devices D, the branch part 40, and the plug part 50 via a flow path connection part such as a joint device. Note that, in the following description, the first pipe 21 and the second pipe 22 are simply referred to as the second wiring material 20 when it is not particularly necessary to distinguish them from each other.

The sheath material 30 covers the first wiring material 10 and the second wiring material 20, and bundles at least a part of the first wiring material 10 and the second wiring material 20 together (see particularly FIG. 3). As the sheath material 30, for example, a wound tape, a corrugated tube, and a binding band can be used. As an example, the sheath material 30 of the present embodiment includes the corrugated tube, and is configured to integrally bundle the first wiring material 10 and the second wiring material 20 together. More specifically, the sheath material 30 includes a first accommodation space 31 into which the first wiring material 10 is inserted and a second accommodation space 32 into which the second wiring material 20 is inserted. The sheath material 30 is, for example, a tubular member formed into a cylindrical shape such as a cylinder, and a space on a cylindrical inner circumference side constitutes the first accommodation space 31 and the second accommodation space 32. The first accommodation space 31 and the second accommodation space 32 are partitioned by a partition wall 33 extending along an extending direction of the sheath material 30. The first accommodation space 31 is a space through which the first wiring material 10 is inserted and which accommodates the first wiring material 10. The second accommodation space 32 is a space through which the second wiring material 20 is inserted and which accommodates the second wiring material 20. In the sheath material 30, the first wiring material 10 is inserted into the first accommodation space 31 and the second wiring material 20 is inserted into the second accommodation space 32 with the partition wall 33 interposed therebetween, and therefore the first wiring material 10 and the second wiring material 20 are partitioned and bundled together. In the sheath material 30, a waterproof layer or the like may be provided between the first accommodation space 31 and the second accommodation space 32. The sheath material 30 is formed of a resin material and the like having relatively high flexibility so as to facilitate bending.

In the wire harness 1, the branch part 40 branches the first wiring material 10 and the second wiring material 20 in accordance with the various devices D, the branch part 40, and the plug part 50. More concretely, the branch part 40 branches a circuit constituted by the first wiring material 10 and a flow path of a fluid such as a liquid constituted by the second wiring material 20. The branch part 40 typically functions as a connection center part of each device D via the first wiring material 10 and the second wiring material 20, and constitutes a so-called connection hub of each device D. Here, as mentioned above, the branch part 40 includes the first branch part 41, the second branch part 42, and the third branch part 43. Each branch part 40 includes, for example, various function components such as a power supply distribution function component, a communication distribution function component, and a fluid flow function component, and a housing that houses the various function components. The power supply distribution function component is connected to the power supply line 11 of the first wiring material 10 and supplies power by distributing electric power from a power supply of the battery D5 or the like to each device D via the power supply line 11. The power supply distribution function component includes various function components related to power distribution such as a relay, a resistor, a transistor, and an intelligent power switch (IPS), for example. The power supply distribution function component may include a circuit protection unit such as a fuse that protects an electric circuit of each device D from a large current equal to or more than a rated current, and a controller such as an electronic control unit (ECU). The communication distribution function component is connected to the communication line 12 of the first wiring material 10 and performs signal communication by distributing various signals to each device D via the communication line 12. The communication distribution function component includes, for example, various function components related to signal communication, such as various transmission/reception devices. The communication distribution function component may include, for example, a noise filter that removes a specific noise, a communication gateway unit that converts a communication protocol between the devices D, and a controller such as an ECU. Examples of the communication protocol using the communication line 12 and the communication distribution function component include, but are not limited to, CAN communication, CAN-FD, Ethernet (registered trademark), and power line communications (PLC). The fluid flow function component is connected to the first pipe 21 and the second pipe 22 of the second wiring material 20, and supplies a fluid such as a liquid by distributing the fluid to each device D via the first pipe 21 and the second pipe 22. The fluid flow function component includes various function components related to fluid supply, for example, a pump that pressurizes a fluid such as a liquid in the flow passage 20a to feed it under pressure to each part, and a flow passage control valve that switches a flow path of the fluid such as a liquid flowing through the flow passage 20a. The fluid flow function component may include a check valve that prevents backflow of the fluid such as a liquid in the flow passage 20a, and a controller such as an ECU.

The plug part 50 is an external connection part capable of connecting the first wiring material 10, the second wiring material 20, and an external device D100 for the vehicle V. The plug part 50 of the present embodiment electrically connects the first wiring material 10 and an external cable CA via the circuit connection part such as the connector, and connects the second wiring material 20 and the external cable CA via the flow path connection part such as the joint device such that a fluid such as a liquid can flow therethrough. The external cable CA is detachably connected to the plug part 50, and the external device D100 is connected to an end portion on a side opposite to a side connected to the plug part 50.

The wire harness 1 configured as described above electrically connects the various devices D by the first wiring material 10 wired to the vehicle V. The devices D electrically connected by the first wiring material 10 can mutually perform power supply and signal communication by mutually exchanging electric power and signals via the first wiring material 10. For example, the battery D5, in which electric power generated by a generator such as an alternator and a rotary electric machine driven by power of the engine D1 is accumulated via the first wiring material 10, serves as a power supply for supplying the accumulated electric power to other devices D as necessary via the first wiring material 10 and driving the other devices D. Further, the wire harness 1 connects the various devices D such that a fluid such as a liquid can flow therethrough by the second wiring material 20 wired to the vehicle V in a state of being bundled with the first wiring material 10. The devices D electrically connected by the second wiring material 20 can mutually supply a fluid such as a liquid by mutually exchanging the fluid via the flow passage 20a in the second wiring material 20.

As mentioned above, the second wiring material 20 of the present embodiment constitutes the circulation path 23 that circulates a fluid such as a liquid through the various devices D by the first pipe 21 and the second pipe 22. Further, the fluid such as a liquid flowing through the second wiring material 20 of the present embodiment and circulating through the circulation path 23 is a heat exchange medium that exchanges heat in each part. As the heat exchange medium of present embodiment, for example, various liquids such as water and antifreeze solution can be used. In this case, in the wire harness 1, a heat insulation layer may be provided between the first wiring material 10 and the second wiring material 20 by wiring a heat insulation material around the second wiring material 20 or interposing a heat insulation material in the partition wall 33.

Further, the second wiring material 20 of the present embodiment constitutes the circulation path 23 that connects a heat source unit 24 that generates heat and a heat consumption unit 25 that consumes heat, and the liquid as the heat exchange medium circulates through the circulation path 23 constituted by the second wiring material 20 and exchanges the heat in the heat source unit 24 and the heat consumption unit 25 to recover and distribute the heat. Here, the heat source unit 24 is, for example, the engine D1 as the heat engine and the heat collection panel D6 that collects thermal energy from solar energy (thermal energy and light energy). In some cases, the battery D5 may also serve as the heat source unit 24. In contrast, the heat consumption unit 25 is typically a unit that requires heat and consumes heat from the heat source unit 24, for example, the heating devices D2 and D3 that heat a seat, a floor, a steering, air in the vehicle V, and the like by thermal energy.

The liquid as the heat exchange medium circulates through the circulation path 23 and is introduced from each first pipe 21 into each heat source unit 24 (the engine D1, the battery D5, and the heat collection panel D6), for example. The liquid as the heat exchange medium introduced into each heat source unit 24 can recover the heat generated in each heat source unit 24 and can cool each heat source unit 24 by exchanging heat with each heat source unit 24 in a heat exchanging unit 26 provided in each heat source unit 24 and connected to each first pipe 21. The liquid as the heat exchange medium that recovered the heat in each heat source unit 24 is discharged from each heat source unit 24 to each second pipe 22 and circulates through the circulation path 23. Then, the liquid as the heat exchange medium that recovered the heat in each heat source unit 24 circulates through the circulation path 23 and is introduced from each first pipe 21 into each heat consumption unit 25 (the heating devices D2 and D3), for example. The liquid as the heat exchange medium introduced into each heat consumption unit 25 delivers the heat recovered from the heat source unit 24 to each heat consumption unit 25 by exchanging heat with each heat consumption unit 25 in the heat exchanging unit 26 provided in each heat consumption unit 25 and connected to each first pipe 21, and the delivered heat is consumed at the heat consumption unit 25. Then, the liquid as the heat exchange medium that delivered the heat to each heat consumption unit 25 is discharged from each heat consumption unit 25 to each second pipe 22 and circulates through the circulation path 23.

In addition, a heat accumulation body 60 as a heat accumulation unit that accumulates heat may be provided in each section of the wire harness 1 of the present embodiment. Here, the second wiring material 20 constitutes the circulation path 23 connected to the heat accumulation bodies 60. For example, the wire harness 1 may be modularized including the heat accumulation bodies 60, or may be modularized without including the heat accumulation bodies 60. As the heat accumulation body 60, various types of the heat accumulation bodies can be used which can accumulate thermal energy supplied via the liquid as the heat exchange medium flowing through the second wiring material 20, and can dissipate heat as necessary, and at least one of the heat accumulation bodies 60 constitutes a part of the above-mentioned heat accumulation device D4. Here, four heat accumulation bodies 60 are provided in total: the heat accumulation bodies 60 constituting a part of the heating devices D2 and D3, and the heat accumulation body 60 provided adjacent to the engine D1 constituting one of the heat source units 24, in addition to the heat accumulation body 60 constituting a part of the heat accumulation device D4. For example, the liquid as the heat exchange medium that recovered the heat from each heat source unit 24 circulates through the circulation path 23 and is introduced from each first pipe 21 into each heat accumulation body 60. The liquid as the heat exchange medium introduced into each heat accumulation body 60 delivers the heat recovered from each heat source unit 24 to each heat accumulation body 60 by exchanging heat with each heat accumulation body 60 in the heat exchanging unit 26 provided in each heat accumulation body 60 and connected to each first pipe 21, and the heat is accumulated in the heat accumulation body 60. The liquid as the heat exchange medium that delivered the heat to each heat accumulation body 60 is discharged from each heat accumulation body 60 to each second pipe 22 and circulates through the circulation path 23. Utilizing this fact, the heat accumulation device D4 can temporarily accumulate the heat generated in each heat source unit 24 (the engine D1, the battery D5, and the heat collection panel D6) in the heat accumulation bodies 60 via the liquid as the heat exchange medium flowing through the second wiring material 20, and thereafter, can supply the heat to the other devices D via the liquid as necessary. In addition, for example, the heating devices D2 and D3 can heat the seat, the floor, the steering, the air in the vehicle V, and the like using the thermal energy accumulated in the heat accumulation bodies 60. In addition, for example, the engine D1 can temporarily accumulate the generated heat in the adjacent heat accumulation body 60, and can reuse the heat as heat for warming up the engine at the time of restart, for example. In addition, for example, each heat accumulation body 60 can also supply excess heat to and interchange the excess heat with a part where heat is insufficient and suppress heat loss, by mutually delivering the accumulated heat via the liquid as the heat exchange medium flowing through the second wiring material 20.

Further, in the wire harness 1 of the present embodiment, a heating element 61 that generates thermal energy from electric energy as necessary may be provided together with the heat accumulation body 60. For example, the wire harness 1 may be modularized including the heating element 61, or may be modularized without including the heating element 61. Here, three heating elements 61 are provided in total: the heating elements 61 respectively corresponding to the heat accumulation bodies 60 of the heating devices D2 and D3, and the heating element 61 corresponding to the heat accumulation body 60 of the heat accumulation device D4. As the heating element 61, a heater or the like that generates heat by electric power supplied via the first wiring material 10 can be used, and the generated heat is accumulated in the heat accumulation body 60. For example, the heating element 61 generates heat using part of electric power at the time of charging the battery D5, and the generated heat is accumulated in the heat accumulation body 60.

Further, in the wire harness 1, the first wiring material 10 and the second wiring material 20 are connected to the external device D100 via the plug part 50, the external cable CA, and the like. With this configuration, the wire harness 1 may exchange electric power, a signal, and a liquid as a heat exchange medium between each device D mounted on the vehicle V and the external device D100 for the vehicle V, to perform power supply, signal communication, and fluid supply. For example, in a case where the external device D100 is an external charging device, an external power supply, or the like, the external device D100 may use electric power having a relatively low cost such as midnight electricity via the external cable CA, the plug part 50, the first wiring material 10, and the like to charge the battery D5, and for example, the external device D100 may supply electric power also to the heating element 61 to generate heat and cause the heat accumulation body 60 to accumulate the generated heat. In addition, for example, in a case where the external device D100 is an external heater, an external heat exchanger, or the like, the external device D100 may directly distribute heat to the heat accumulation body 60 and the like via a liquid as a heat exchange medium flowing through the external cable CA, the plug part 50, the second wiring material 20, and the like, to accumulate the heat. In addition, in a case where there is excess electric power in the vehicle V, each device D of the vehicle V may supply the excess electric power to and interchange the excess electric power with the external device D100 via the first wiring material 10, the plug part 50, the external cable CA, and the like. Similarly, in a case where there is excess heat in the vehicle V, each device D of the vehicle V may supply the excess heat to and interchange the excess heat with the external device D100 via a liquid as a heat exchange medium flowing through the second wiring material 20, the plug part 50, the external cable CA, and the like.

A flow path of the liquid as the heat exchange medium circulating through the circulation path 23 constituted by the second wiring material 20 as described above is appropriately changed by operation of the fluid flow function component of each branch part 40, and by appropriately flowing through each device D (the engine D1, the heating devices D2 and D3, the heat accumulation device D4, the battery D5, and the heat collection panel D6), the heat accumulation body 60, and the plug part 50, the liquid recovers and accumulates heat in a necessary part, and transfers and distributes the heat to a necessary part.

The wire harness 1 described above includes the conductive first wiring material 10 wired to the vehicle V, and the second wiring material 20 wired to the vehicle V in a state where at least a part of, here the whole of, the second wiring material 20 is bundled with the first wiring material 10, and having a flow passage 20a formed therein through which a fluid such as a liquid can flow.

Therefore, the wire harness 1 can enhance the assemblability to the vehicle V, since in a state where the second wiring material 20 having an a flow passage 20a therein through which a fluid such as a liquid can flow is bundled with the conductive first wiring material 10, in addition to the first wiring material 10, the first wiring material 10 and the second wiring material 20 can be wired to the vehicle V together. In addition, since the wire harness 1 can be wired in a state where the first wiring material 10 and the second wiring material 20 are bundled, a wiring space can be secured easily. With this configuration, the wire harness 1 can enhance workability during assembly, and for example, it is possible to simplify a work of handling and collecting various wiring bodies. As a result, the wire harness 1 can improve efficiency in a work of assembly and enhance manufacturing efficiency.

Furthermore, the wire harness 1 described above includes the sheath material 30 that bundles the first wiring material 10 and the second wiring material 20. Therefore, since the wire harness 1 can reliably bundle the first wiring material 10 and the second wiring material 20 together by the sheath material 30, the wire harness 1 can reliably enhance assemblability to the vehicle V.

Furthermore, in the wire harness 1 described above, the sheath material 30 includes the first accommodation space 31 into which the first wiring material 10 is inserted and the second accommodation space 32 which is partitioned from the first accommodation space 31 and into which the second wiring material 20 is inserted. Therefore, in the wire harness 1, the first wiring material 10 is inserted into the first accommodation space 31 and the second wiring material 20 is inserted into the second accommodation space 32, and accordingly, the wire harness 1 can bundle the first wiring material 10 and the second wiring material 20 together while partitioning them into separate spaces.

Furthermore, in the wire harness 1 described above, the second wiring material 20 constitutes the circulation path 23 that connects the heat source unit 24 that generates heat and the heat consumption unit 25 that consumes the heat, and the liquid is the heat exchange medium that circulates through the circulation path 23 constituted by the second wiring material 20 to exchange heat in the heat source unit 24 and the heat consumption unit 25. Therefore, the wire harness 1 can recover the heat generated in the heat source unit 24 via the liquid as the heat exchange medium flowing through the second wiring material 20, and distribute the recovered heat to the heat consumption unit 25 that requires the heat via the liquid, so that the heat is consumed in the heat consumption unit 25. As a result, the wire harness 1 can use the heat generated by the heat source unit 24 in the heat consumption unit 25, and therefore can enhance thermal efficiency in the vehicle V, and enhance fuel economy and environmental performance.

Furthermore, in the wire harness 1 described above, the second wiring material 20 further constitutes the circulation path 23 connected to the heat accumulation body 60 that accumulates heat. Therefore, the wire harness 1 can recover the heat generated in the heat source unit 24 via the liquid as the heat exchange medium flowing through the second wiring material 20, temporarily accumulate the heat in the heat accumulation body 60, and thereafter cause the heat consumption unit 25 to consume the heat via the liquid as necessary. As a result, the wire harness 1 can suppress the heat generated in the heat source unit 24 from being dissipated and consumed wastefully and can effectively use the heat at a necessary part, and therefore can enhance thermal efficiency in the vehicle V, and further enhance fuel economy and environmental performance.

Furthermore, the wire harness 1 described above includes the plug part 50 that can connect the first wiring material 10, the second wiring material 20, and the external device D100 for the vehicle V. Therefore, in the wire harness 1, the first wiring material 10 and the second wiring material 20 are connected to the external device D100 via the plug part 50. With this configuration, the wire harness 1 can exchange electric power, a signal, and a liquid as a heat exchange medium between each device D mounted on the vehicle V and the external device D100 for the vehicle V, and perform power supply, signal communication, and fluid supply, and therefore electric power and heat can be mutually supplied and interchanged.

Furthermore, in the wire harness 1 described above, the first wiring material 10 includes the power supply line 11 for power supply and the communication line 12 for signal communication. Accordingly, the wire harness 1 can bundle the power supply line 11 and the communication line 12 constituting the first wiring material 10, and the second wiring material 20 together to be wired to the vehicle V, and therefore, can further enhance the assemblability to the vehicle V.

Second Embodiment

A wire harness according to a second embodiment is different from that of the first embodiment in an application target, a configuration of a second wiring material, and the like. In the following, common reference signs are given to components similar to those in the above-mentioned embodiment, and duplicate descriptions are omitted as much as possible for common configurations, operations, and effects (the same applies hereinafter).

Figure 4:
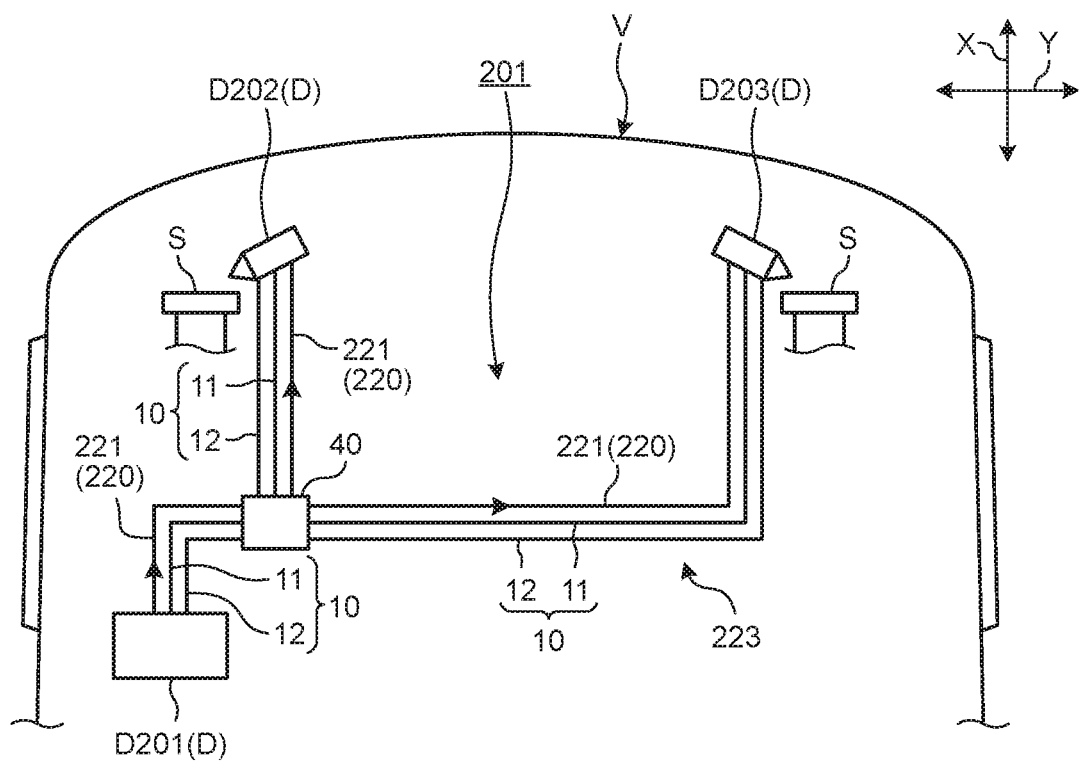
FIG. 4 is a schematic block diagram representing a schematic configuration of a wire harness according to a second embodiment.
Figure 5:
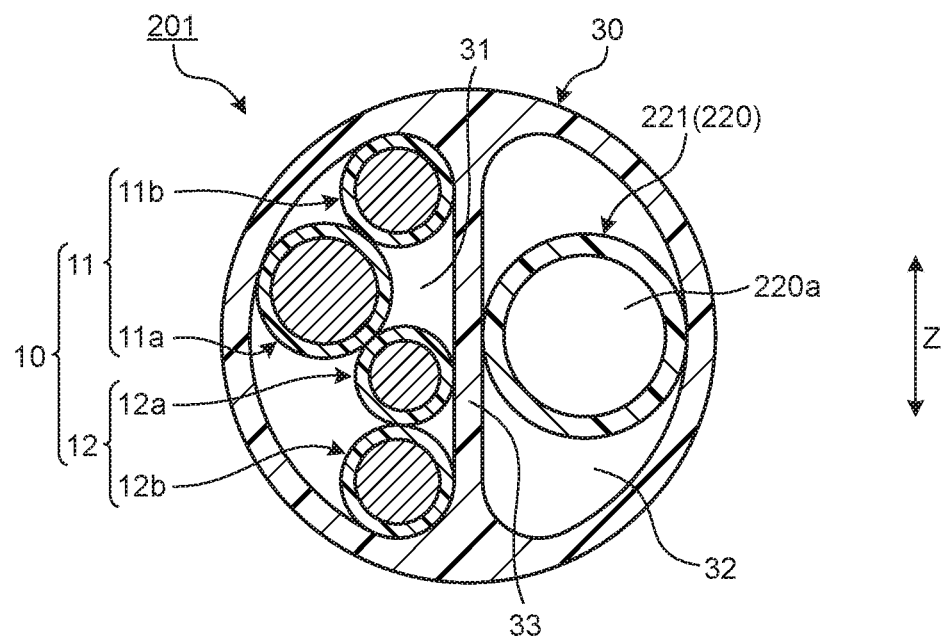
FIG. 5 is a schematic cross-sectional view representing the schematic configuration of the wire harness according to the second embodiment.

A wire harness 201 of the present embodiment illustrated in FIGS. 4 and 5 is different from the above-mentioned wire harness 1 in that a second wiring material 220 is included instead of the second wiring material 20, but other configurations are almost the same as those of the wire harness 1. In addition, the wire harness 201 of the present embodiment is similar to the above-mentioned wire harness 1 in that the wire harness 201 is applied to a vehicle V, but the application target in the vehicle V is different from that of the wire harness 1.

Specifically, as illustrated in FIGS. 4 and 5, the wire harness 201 includes a first wiring material 10 wired to the vehicle V, a second wiring material 220 wired to the vehicle V in a state where at least a part of the second wiring material 220 is bundled with the first wiring material 10, a sheath material 30, and a branch part 40. The first wiring material 10 and the second wiring material 220 connect various devices D mounted on the vehicle V to one another. Note that here, although the wire harness 201 is illustrated as not including a plug part 50, the present embodiment is not limited to this configuration, and the plug part 50 may be provided. In addition, as an example, the number of branch parts 40 in the present embodiment illustrated in the drawing is one.

Here, in the example of FIG. 4, a storage unit D201, two injecting units D202 and D203, and the like are illustrated as the various devices D mounted on the vehicle V. The storage unit D201 is a tank which is mounted on the vehicle V and stores a liquid flowing through the second wiring material 220. The injecting units D202 and D203 are mounted on the vehicle V and inject the liquid flowing through the second wiring material 220, and include, for example, a nozzle, a control valve, and a drive motor. For example, the wire harness 201 may be modularized including these various devices D (the storage unit D201, and the injecting units D202 and D203), or modularized without including these various devices D. The first wiring material 10 of the present embodiment includes one that connects the storage unit D201 and the branch part 40, one that connects the branch part 40 and the injecting unit D202, and one that connects the branch part 40 and the injecting unit D203.

The second wiring material 220 is a hollow wiring material wired to the vehicle V in a state where at least a part of the second wiring material 220 is bundled with the first wiring material 10, and having a flow passage 220a formed therein through which a liquid can flow (see particularly FIG. 5). The second wiring material 220 connects the various devices D mounted on the vehicle V, here, the storage unit D201, and the injecting units D202 and D203, so that a liquid can mutually flow therethrough. Further, the second wiring material 220 of the present embodiment is different from the above-mentioned second wiring material 20 in that a supply pipe 221 is included instead of the first pipe 21 and the second pipe 22, but other configurations are almost the same as those of the second wiring material 20. The second wiring material 220 of the present embodiment constitutes a supply path 223 by the supply pipe 221. The supply path 223 connects the storage unit D201 and the injecting units D202 and D203, and supplies the liquid stored in the storage unit D201 to the injecting units D202 and D203. In the example of FIG. 4, the second wiring material 220 includes one that connects the storage unit D201 and the branch part 40, one that connects the branch part 40 and the injecting unit D202, and one that connects the branch part 40 and the injecting unit D203, and constitutes the supply path 223. Further, the liquid that flows through the second wiring material 220 of the present embodiment and is supplied from the storage unit D201 to the injecting units D202 and D203 via the supply path 223 is a cleaning liquid (washer liquid) for cleaning a cleaning target portion S in the vehicle V. The injecting units D202 and D203 inject the liquid as the cleaning liquid supplied from the storage unit D201 via the flow passage 220a of the second wiring material 220 to the cleaning target portion S to clean the cleaning target portion S. The cleaning target portion S is various cameras and sensors mounted on the vehicle V, for example. By cleaning the cleaning target portion S with the liquid as a cleaning liquid injected from the injecting units D202 and D203, for example, it is prevented that an image is captured while a foreign matter is attached to a lens and that sensor sensitivity is lowered.

The wire harness 201 as described above can enhance assemblability to the vehicle V, since in a state where the second wiring material 220 having an flow passage 220a therein through which a liquid can flow, is bundled with the conductive first wiring material 10, in addition to the first wiring material 10, the first wiring material 10 and the second wiring material 220 can be wired to the vehicle V together.

Furthermore, in the wire harness 201 described above, the second wiring material 220 constitutes the supply path 223 that connects the storage unit D201 that stores the liquid and the injecting units D202 and D203 that injects the liquid to the cleaning target portion S, and the liquid is the cleaning liquid supplied from the storage unit D201 to the injecting units D202 and D203 via the supply path 223 constituted by the second wiring material 220. Therefore, the wire harness 201 can supply from the storage unit D201 to the injecting units D202 and D203 via the liquid as a cleaning liquid flowing through the second wiring material 220, and inject the liquid from the injecting units D202 and D203 to the cleaning target portion S, to clean the cameras and sensors constituting the cleaning target portion S. As a result, for example, the wire harness 201 can make it easier to favorably maintain image accuracy of a camera and sensor sensitivity of a sensor used for automatic operation and the like of the vehicle V, and therefore, can enhance accuracy of automatic operation of the vehicle V. In addition, by flow of the liquid as a cleaning liquid through the flow passage 220a of the second wiring material 220 bundled with the first wiring material 10 constituted by the power supply line 11 and the communication line 12, the wire harness 201 can cool the first wiring material 10 and suppress heat generation.

Note that the above-mentioned wire harnesses according to the embodiments of the present invention are not limited to the above-mentioned embodiments, and various modifications are possible within the scope described in the claims. The wire harness according to the present embodiment may be configured by appropriately combining the components of the above-described embodiments and modification.

In the above description, the power supply line 11 is described as including two lines in total: the power line 11a for power supply, and the ground wire 11b for grounding, and the communication line 12 is described as including two communication lines 12a and 12b in total, but the present invention is not limited to this configuration. For example, the power supply line 11 may not include the ground wire 11b, or a plurality of power lines 11a may be provided. In addition, the communication line may be used also by the power supply line 11, and used for the above-mentioned power line communication (PLC). In addition, the first wiring material 10 is described as including the power supply line 11 for power supply and the communication line 12 for signal communication, but the present invention is not limited to this configuration, and for example, either one of the power supply line 11 or the communication line 12 may not be included. More concretely, in the above description, the first wiring material 10 is described as being formed by wiring four lines in total: the power line 11a for power supply, the ground wire 11b for grounding, and the communication lines 12a and 12b for communication, but the present invention is not limited to this configuration, and either one or five or more of the lines may be wired.

The wire harnesses 1 and 201 described above may further include a cable for optical communication, and in this case, the communication distribution function component in the branch part 40 may include an optical function component related to optical communication as necessary. In addition, exterior parts such as a grommet, a protector, a fixture, and the like may be further assembled to the wire harnesses 1 and 201.

In the above description, the wire harnesses 1 and 201 are described as including the sheath material 30, but the present invention is not limited to this configuration as long as the first wiring material 10 and the second wiring materials 20 and 220 are bundled not by the sheath material 30 or the like. In addition, the second wiring materials 20 and 220 are described as extending entirely along the first wiring material 10 and wired to be bundled with the first wiring material 10, the present invention is not limited to this configuration as long as at least a part of the second wiring materials 20 and 220 is bundled together with the first wiring material 10.

Figure 6:
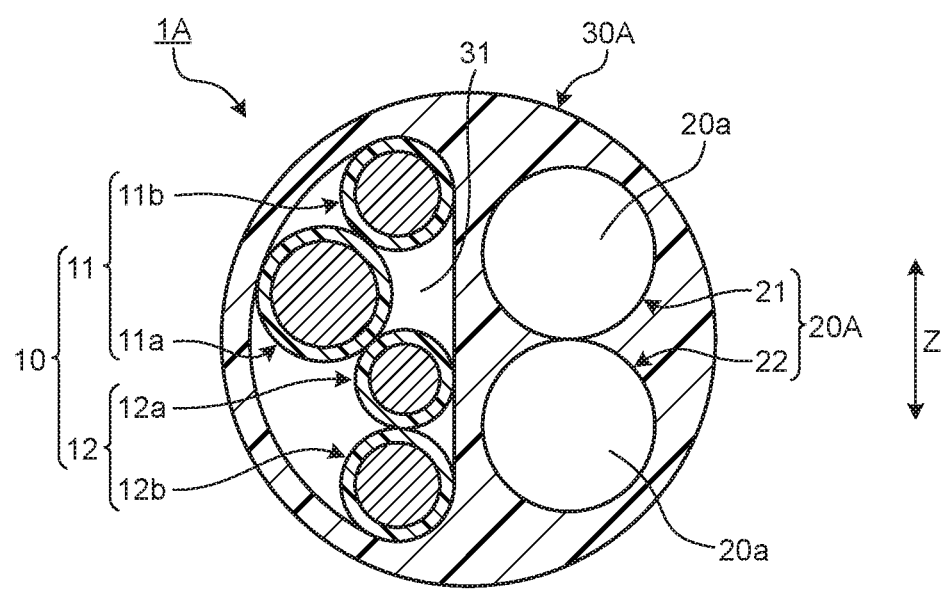
FIG. 6 is a schematic cross-sectional view representing a schematic configuration of a wire harness according to a modification.

In addition, in the above description, it is described that the sheath material 30 is formed separately from the second wiring materials 20 and 220, and that the second wiring materials 20 and 220 are inserted into the second accommodation space 32, but the present invention is not limited to this configuration. For example, a second wiring material 20A and a sheath material 30A may be integrally formed as illustrated in a wire harness 1A according to a modification of FIG. 6. In this case, the second wiring material 20A may have a configuration in which a resin material constituting the first pipe 21 and the second pipe 22 and a resin material constituting the sheath material 30A are integrally molded, and the sheath material 30A does not include the second accommodation space 32, the partition wall 33, and the like. In this case, the wire harness 1A can reduce the number of constituent parts, and in this respect as well, can enhance workability during assembly and enhance manufacturing efficiency. Also in this case, the wire harness 1A may be provided with a waterproof layer or a heat insulation layer between the first wiring material 10 and the second wiring material 20A.

In the above description, the wire harnesses 1 and 1A are described as including the plug part 50, but the present invention is not limited to this configuration, and the plug part 50 may not be provided. In addition, the plug part 50 described above is described as being capable of connecting the first wiring material 10, the second wiring materials 20 and 20A, and the external device D100 for the vehicle V, but the present invention is not limited to this configuration, and for example, the first wiring material 10 and the external device D100 for the vehicle V may not be connectable.

In the above description, examples of the various devices D mounted on the vehicle V include the engine D1, the heating devices D2 and D3, the heat accumulation device D4, the battery D5, and the heat collection panel D6 in the examples of FIGS. 1 and 2, and include the storage unit D201 and the injecting units D202 and D203 in the example of FIG. 4, but the present invention is not limited to these configurations.

In the above description, the wire harnesses 1 and 1A are described as including the pump and the like as the fluid flow function components in the branch part 40, but the pump may not be included, and for example, a liquid as a heat exchange medium may flow through the flow passage 20a of the second wiring materials 20 and 20A utilizing convection caused by a temperature difference occurring in the liquid. In addition, the excess heat of the heat recovered by the heat exchange medium flowing through the flow passage 20a of the second wiring materials 20 and 20A may be converted from thermal energy to electric energy by a thermoelectric element or the like and accumulated in the battery D5.

In the above description, the liquid flowing through the flow passages 20a and 220a of the second wiring materials 20, 20A, and 220 is described as the heat exchange medium or the cleaning liquid, but the present invention is not limited to this configuration. Other liquid may be used as long as the liquid is used in the vehicle V or generated in the vehicle V, for example, water generated in a fuel burned in the engine D1 or in a fuel cell in a so-called fuel cell vehicle may be used. In addition, the liquid may be a cooling medium that cools each part of the vehicle V. In addition, in the wire harnesses 1 and 1A described above, the heat exchange medium flowing through the flow passage 20a of the second wiring materials 20 and 20A is described as a liquid, but the present invention is not limited to this configuration, and in addition to a liquid, a fluid (heat exchange fluid) such as a gas and a gas-liquid two-phase flow in which a gas and a liquid are mixed may be used.

A wire harness according to the present embodiment has an effect of enhancing assemblability to a vehicle, since in a state where a second wiring material having a flow passage therein through which a fluid such as a liquid can flow is bundled with a conductive first wiring material, in addition to the first wiring material, the first wiring material and the second wiring material can be wired to the vehicle together.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising
a conductive first wiring material wired to a vehicle;
a second wiring material wired to the vehicle in a state where at least a part of the second wiring material is bundled with the first wiring material, and having a flow passage formed therein through which a liquid can flow; and
a sheath material that bundles the first wiring material and the second wiring material, wherein
the second wiring material and the sheath material are integrally formed.

2. A wire harness comprising:
a conductive first wiring material wired to a vehicle; and
a second wiring material wired to the vehicle in a state where at least a part of the second wiring material is bundled with the first wiring material, and having a flow passage formed therein through which a liquid can flow,
wherein the second wiring material constitutes a circulation path that connects a heat source unit that generates heat and a heat consumption unit that consumes heat,
wherein the liquid is a heat exchange medium that circulates through the circulation path constituted by the second wiring material and exchanges heat in the heat source unit and the heat consumption unit, and
wherein the second wiring material further constitutes the circulation path connected to the heat accumulation unit that accumulates heat.

3. The wire harness according to claim 1, wherein the sheath material includes a first accommodation space into which the first wiring material is inserted, and a second accommodation space which is partitioned from the first accommodation space and into which the second wiring material is inserted.

4. A wire harness comprising:
a conductive first wiring material wired to a vehicle;
a second wiring material wired to the vehicle in a state where at least a part of the second wiring material is bundled with the first wiring material, and having a flow passage formed therein through which a liquid can flow; and an external connection part capable of connecting the second wiring material and an external device for the vehicle.

5. The wire harness according to claim 1, wherein
the second wiring material constitutes a circulation path that connects a heat source unit that generates heat and a heat consumption unit that consumes heat, and
the liquid is a heat exchange medium that circulates through the circulation path constituted by the second wiring material and exchanges heat in the heat source unit and the heat consumption unit.

6. The wire harness according to claim 1, wherein
the first wiring material includes a power supply line for power supply and a communication line for signal communication.

7. The wire harness according to claim 3, wherein
the second wiring material constitutes a circulation path that connects a heat source unit that generates heat and a heat consumption unit that consumes heat, and
the liquid is a heat exchange medium that circulates through the circulation path constituted by the second wiring material and exchanges heat in the heat source unit and the heat consumption unit.

8. The wire harness according to claim 3, further comprising:
an external connection part capable of connecting the second wiring material and an external device for the vehicle.

9. The wire harness according to claim 5, wherein
the second wiring material further constitutes the circulation path connected to the heat accumulation unit that accumulates heat.

10. The wire harness according to claim 1, wherein
the second wiring material constitutes a supply path that connects a storage unit that stores the liquid and a injecting unit that injects the liquid to a cleaning target portion, and
the liquid is a cleaning liquid supplied from the storage unit to the injecting unit via the supply path constituted by the second wiring material.

11. The wire harness according to claim 1, further comprising:
an external connection part capable of connecting the second wiring material and an external device for the vehicle.

12. The wire harness according to claim 3, wherein
the second wiring material constitutes a supply path that connects a storage unit that stores the liquid and a injecting unit that injects the liquid to a cleaning target portion, and
the liquid is a cleaning liquid supplied from the storage unit to the injecting unit via the supply path constituted by the second wiring material.

* * * * *